US012722172B2

(12) United States Patent
Ye et al.

(10) Patent No.: US 12,722,172 B2
(45) Date of Patent: Sep. 1, 2026

(54) HANDHELD ELECTRIC SPRAYER WITH NEGATIVE-PRESSURE SOFT LIQUID BAG

(71) Applicant: JINHUA YANCHUANG TECHNICAL CO., LTD., Jinhua (CN)

(72) Inventors: Genzhang Ye, Jinhua (CN); Haolv Ye, Jinhua (CN); Jiang Fu, Jinhua (CN); Zaigang Luo, Jinhua (CN); Rui Fu, Jinhua (CN)

(73) Assignee: JINHUA YANCHUANG TECHNICAL CO., LTD., Jinhua (CN)

( * ) Notice: Subject to any disclaimer, the term of this patent is extended or adjusted under 35 U.S.C. 154(b) by 191 days.

(21) Appl. No.: 18/789,737

(22) Filed: Jul. 31, 2024

(65) Prior Publication Data

US 2026/0001090 A1 Jan. 1, 2026

(30) Foreign Application Priority Data

Jun. 28, 2024 (CN) ......................... 202410854670.3

(51) Int. Cl.
*B05B 9/08* (2006.01)

(52) U.S. Cl.
CPC .......... *B05B 9/0894* (2013.01); *B05B 9/0861* (2013.01)

(58) Field of Classification Search
CPC ... B05B 9/0894; B05B 9/0861; B05B 9/0838; B05B 9/0413; B05B 9/0426; B05B 15/65; B05B 15/55
See application file for complete search history.

(56) References Cited

U.S. PATENT DOCUMENTS 4,272,019 A * 6/1981 Halaby, Jr. .............. F16L 37/33 285/914
2009/0173904 A1* 7/2009 Roberts ................. F16K 43/006 251/340
2013/0277455 A1* 10/2013 Thompson ............ B05B 9/0866 239/289

FOREIGN PATENT DOCUMENTS

CN 107816419 A * 3/2018 ........... B05B 9/0861
NL 1021793 C2 * 6/2004 ........... B05B 7/2424

* cited by examiner

*Primary Examiner* — Steven M Sutherland
(74) *Attorney, Agent, or Firm* — Bayramoglu Law Offices LLC

(57) ABSTRACT

A handheld electric sprayer with a negative-pressure soft liquid bag includes a sprayer body, wherein a motor and a plunger pump assembly are arranged in the sprayer body, a transmission mechanism rotatably connected with the motor is arranged in the sprayer body, a slider is arranged between the transmission mechanism and the plunger pump assembly, and limiting parts are arranged between the slider and the sprayer body; the plunger pump assembly includes a piston rod, and when the motor drives the transmission mechanism to rotate, the slider drives the piston rod to stretch and retreat; a storage device detachably is arranged on an outer side of the sprayer body, and the storage device is connected with the plunger pump assembly; and a pressure relief device is arranged on the plunger pump assembly, and a return passage is arranged between the pressure relief device and the storage device.

10 Claims, 13 Drawing Sheets

HANDHELD ELECTRIC SPRAYER WITH NEGATIVE-PRESSURE SOFT LIQUID BAG

CROSS-REFERENCE TO THE RELATED APPLICATIONS

This application is based upon and claims priority to Chinese Patent Application No. 202410854670.3, filed on Jun. 28, 2024, the entire contents of which are incorporated herein by reference.

BACKGROUND OF THE INVENTION

1. Technical Field

The invention belongs to the technical field of sprayers, and particularly relates to a handheld electric sprayer with a negative-pressure soft liquid bag.

2. Description of Related Art

Spray guns are common spray tools. According to handheld high-pressure sprayers on the present market, a storage tank (liquid container) and a plunger pump are arranged on a lower portion of the front side of the sprayer body to pump paint upwards, so it is difficult to pump out the paint, and the paint cannot be fed smoothly; blockage occurs easily when the sprayers are used by operators, and the center of gravity of the sprayers is near the front, so the operators get fatigued easily; moreover, because a storage device and a plunger pump assembly of existing sprayers are arranged on the same side, the center of gravity of the sprayer body is near the front, and the paint spraying direction is unstable when the sprayer body is held by operators, leading to an unsatisfying spraying effect. In addition, because the storage device is arranged on the lower portion of the sprayer body, paint cannot be added conveniently and is likely to overflow from the storage tank, leading to environmental pollution. After the sprayer is pressurized, paint is sprayed out via tiny spray holes in the sprayer to form a fan-shaped mist. Such existing sprayers typically comprise a motor, a transmission device and a pump, wherein the pump is connected with a paint storage device by means of a multi-way connector; an eccentric cam is arranged on the transmission device, and when the eccentric cam rotates, a piston shaft of the pump is driven to stretch and retreat; a transmission part is arranged between the eccentric am and the piston shaft of the pump, and the transmission part is slidably connected with the eccentric cam and the piston shaft of the pump. Because the transmission part is limited only by the eccentric cam and the piston shaft of the pump body, a large gap is formed between the transmission part and the sprayer body, leading to shaking of the transmission part with respect to the sprayer in the moving process. As a result, the transmission part will be abraded after long-term use of the sprayer, and can no longer push the piston shaft to stretch and retreat in the axial direction, and the pump will be damaged, thus compromising the service life. In addition, the paint storage device of existing sprayers is directly connected with the multi-way connector, so paint in the paint storage device is easily left in the pump. As a result, the pump will be blocked after long-term use, compromising its service life. Therefore, it is necessary to design a handheld electric sprayer with a negative-pressure soft liquid bag to overcome these defects.

BRIEF SUMMARY OF THE INVENTION

In view of the problems in the prior art, the invention designs a handheld electric sprayer with a negative-pressure soft liquid bag. According to the handheld electric sprayer with a negative-pressure soft liquid bag provided by the invention, limiting parts are arranged in a sprayer body to limit a slider in an axial direction and a radial direction, such that the slider can move more reliably, and a plunger pump assembly can operate more stably. A detachable storage device is arranged on an upper portion of the sprayer body, such that loading and cleaning are facilitated, and using is more convenient and reliable.

The purpose of the invention is fulfilled by the following technical solution: a handheld electric sprayer with a negative-pressure soft liquid bag comprises a sprayer body, wherein a motor and a plunger pump assembly are arranged in the sprayer body, a transmission mechanism rotatably connected with the motor is arranged in the sprayer body, a slider for connecting the transmission mechanism and the plunger pump assembly is arranged between the transmission mechanism and the plunger pump assembly, and limiting parts are arranged between the slider and the sprayer body; the plunger pump assembly comprises a piston rod, and when the motor drives the transmission mechanism to rotate, the slider drives the piston rod to stretch and retreat; a storage device detachably connected with the sprayer body is arranged on an outer side of the sprayer body, and the storage device is connected with the plunger pump assembly; and a pressure relief device connected with the plunger pump assembly is arranged on the plunger pump assembly, and a return passage is arranged between the pressure relief device and the storage device.

Preferably, the transmission mechanism comprises a mounting bracket, a mounting platform, a reduction gear, a transmission shaft, an eccentric cam and a limiting disk; the mounting bracket and the mounting platform are fixedly mounted on the sprayer body, and the transmission shaft is mounted on the mounting bracket and the mounting platform by means of bearings respectively; a first gear rotating synchronously with the motor is arranged on the motor and meshes with the reduction gear; the reduction gear and the eccentric cam which rotate synchronously with the transmission shaft are arranged on the transmission shaft, and the limiting disk rotating synchronously with the eccentric cam is disposed around the eccentric cam and slidably connected with the slider.

When the motor operates, the first gear is driven to rotate, and when the first gear rotates, the reduction gear is driven to rotate with respect to the sprayer body; when the reduction gear rotates, the transmission shaft is driven to rotate, and when the transmission shaft rotates, the eccentric cam is driven to rotate; when the eccentric cam rotates, the limiting disk is driven to rotate eccentrically to drive the slider to reciprocate; and when the slider moves, the piston rod is pushed to stretch and retreat. By means of the mounting bracket and the mounting platform, the transmission shaft can rotate more stably with respect to the sprayer body, and the transmission effect is better.

Preferably, a pair of first limiting grooves is formed in the slider, and the limiting disk is arranged in the first limiting grooves; the limiting disk fits the first limiting grooves in outer contour; the limiting parts are arranged at two open ends of the slider respectively, and each of the limiting parts has one end surface attached to the slider and the other end surface attached to the sprayer body; and a second limiting groove to be connected with the piston rod is formed in an outer side of the slider.

The first limiting grooves are arranged, and the limiting disk fits the first limiting grooves in outer contour, such that the slider can be vertically limited with respect to the sprayer body by the limiting disk; end surfaces of the first limiting grooves are perpendicular to end surfaces of the sprayer body, and the axial direction of the first limiting grooves is perpendicular to the axial direction of the piston rod, such that the slider can be clamped in the limiting disk in a direction perpendicular to the sprayer body, thus facilitating the installation of the sliders. Moreover, the limiting parts are arranged between the sprayer body and an open section of the slider, such that the slider is prevented from sliding forwards and backwards with respect to the sprayer body. In this way, the slider is synchronously limited by the limiting parts and the limiting disk, and thus can neither move vertically with respect to the sprayer body nor move forwards and backwards with respect to the sprayer body either and can only move leftwards and rightwards in the axial direction of the piston rod. By means of the second limiting groove, the slider can be easily connected with the piston rod.

Preferably, the limiting parts are fixedly mounted on the sprayer body; a plurality of limiting protrusions are uniformly arranged at an end, facing the sprayer body, of each of the limiting parts, receiving grooves for mounting the limiting protrusions are formed in the sprayer body, and the limiting protrusions fit the receiving grooves in outer contour; a cylindrical protrusion is disposed at a tail end of the piston rod and slidably arranged in the second limiting groove; and the cylindrical protrusion is slidably connected with the second limiting groove.

By means of the cooperative installation of the limiting protrusions and the receiving grooves, the limiting parts can be mounted on the sprayer body more firmly, and the slider can be better limited in the front-back direction by the limiting parts. The cylindrical protrusion is arranged at the tail end of the piston rod and clamped in the second limiting groove, such that the slider and piston rod are connected more firmly and can slide relatively.

Preferably, the plunger pump assembly comprises a multi-way connector and a pump body, and a storage mounting base threadedly connected with the multi-way connector is arranged on the multi-way connector; a storage device threadedly connected with the storage mounting base is arranged on the storage mounting base, and a filter device is arranged in the storage mounting base; a feed inlet and a discharge outlet are formed in the multi-way connector; a first check valve ball is arranged between the feed inlet and the filter device, and a second check valve ball is arranged between the discharge outlet and the pump body; a pressure relief port is formed in the multi-way connector, and a pressure relief device detachably connected with the multi-way connector is arranged at an open end of the multi-way connector; and a return port is formed in the multi-way connector, and the return passage connected with the return port is arranged at the return port.

The pump body can be easily connected with the storage mounting base by means of the multi-way connector, and then the pump body is connected with the storage device by means of the storage mounting base; and the filter device can prevent impurities in paint from entering the pump body through the multi-way connector, such that the service life of the pump body is prolonged. By means of the first check valve ball, paint can enter the multi-way connector only along the feed inlet and will not flow back into the storage device when the plunger pump assembly operates; and by means of the second check valve ball, paint can enter the pump body only along the discharge outlet and will not flow back into the multi-way connector when the plunger pump assembly operates. By means of the pressure relief device, the pressure relief port can be easily controlled to be opened or closed. By means of the return port, the return passage can be easily connected with the inside of the storage device. By means of the return passage, the pressure in the multi-way connector can be released, and a cleaning agent can enter the storage mounting base through the return passage; and an external cleaning device is connected with the storage mounting base, such that the cleaning agent can be discharged.

Preferably, the storage device comprises a storage bag, a sealing cover and an adapter; the storage bag is threadedly connected with the adapter, the sealing cover threadedly connected with the adapter is arranged on the adapter, and the adapter is threadedly connected with the storage mounting base; the filter device is arranged between the storage mounting base and the adapter, the bottom of the filter device is attached to an end surface of the storage mounting base, and a bracket of the filter device is attached to an end surface of the adapter; and a filter screen of the filter device faces the adapter.

When the storage device is mounted, the storage bag and the adapter are connected first, then the adapter and the storage mounting base are threadedly connected, paint is added into the storage bag via the open end of the adapter, and then the open end of the adapter is sealed by the sealing cover; because the storage bag and the adapter of the storage device are mounted separately, the adapter can be cleaned separately, and the cleaning effect is better. Moreover, the storage bag is prevented from direct contact with the storage mounting base, such that less paint is left in the storage mounting base, and the storage mounting base and the pump body are prevented from being blocked. In addition, the storage device can be disassembled and assembled, and the storage bag can be replaced and mounted separately, such that disassembly is easy, and the universality is good. By means of the filter device, impurities are prevented from directly entering the multi-way connector. After clean water is added into the storage bag, the motor can be started to allow the clean water to enter the pump body to clean the plunger pump assembly, such that cleaning is easy and reliable. Here, the storage bag is a soft liquid bag.

Preferably, a cleaning device detachably connected with the storage mounting base is arranged on the storage mounting base and comprises a cleaning mounting base, a mounting cover, a water delivery pipe and a water outlet pipe; the cleaning mounting base and the storage mounting base are connected threadedly, and the mounting cover in close fit and connection with the cleaning mounting base is arranged on the cleaning mounting base; a first connecting port and a water outlet are formed in the cleaning mounting base, and the first connecting port is connected with the water delivery pipe; and the water outlet is connected with the water outlet pipe, and the water outlet and the return passage are connected.

When cleaning is needed, the cleaning device is mounted on the storage mounting base. The water delivery pipe is mounted on the first connecting port, the water delivery pipe is connected to a water source, and the water outlet pipe is connected to the water outlet. During cleaning, the water source is turned on, and then the motor is started, such that water is continuously pressed into the pump body to clean the pump body. At the beginning of cleaning, the pressure relief device is closed to allow water to directly enter the pump body; after the pump body is cleaned for a period of time, the pressure relief device is opened to allow part of the water to enter the water outlet through the return passage; when, whether there exists the color of paint in the return passage is observed; if there is not the color of paint in the return passage, water will be discharged directly via the water outlet, and the inside of the multi-way connector will be cleaned when the water is discharged. By means of the cleaning device, the plunger pump assembly can be cleaned quickly and reliably, and blockage of the pump body caused by residual paint is avoided, thus prolonging the service life of the pump body.

Preferably, a first abutting base and a second abutting base threadedly connected with open ends of the multi-way connector are arranged at the open ends of the multi-way connector respectively, a first spring is arranged between the first abutting base and the feed inlet, one end of the first spring abuts against an inner wall of the discharge outlet, and the other end of the first spring abuts against the first check valve ball; the first check valve ball is adjacent to an open end of the first abutting base, and when the plunger pump assembly operates, the first check valve ball moves in the axial direction with respect to the open end of the first abutting base; a second spring is arranged between the second abutting base and the discharge outlet, one end of the second spring abuts against the second abutting base, and the other end of the second spring abuts against the second check valve ball; the second check valve ball is adjacent to the discharge outlet, and when the plunger pump assembly operates, the second check valve ball moves with respect to the discharge outlet; and the first abutting base and the second abutting base are both hollow, and the second abutting base is connected with the pump body.

The multi-way connector can be easily controlled to be opened or closed by operation of the plunger pump assembly. When the piston rod retreats, the tail end of the piston rod is away from the inside of the multi-way connector, such that a negative pressure is generated in the multi-way connector, the first check valve ball squeezes the first spring, the open end of the first abutting base is in an open state, and paint enters the multi-way connector along the feed inlet. Because of the negative pressure generated in the multi-way connector, the second spring is always in a compressed state, the second check valve ball is sucked to the discharge outlet, and the discharge outlet is in a closed state, such that paint is pumped into the multi-way connector from the storage device. When stretching out, the piston rod squeezes an inner cavity of the multi-way connector, the first spring restores, the first check valve ball abuts against the open end of the first abutting base, and paint cannot flow back into the storage device. At this moment, the paint squeezes the second check valve ball to drive the second check valve ball to move away from the discharge outlet, and the second spring is further compressed, such that the paint can enter the pump body via the discharge outlet. Then, the motor drives the piston rod to stretch and retreat repeatedly by means of the transmission mechanism, such that the paint continuously enters the pump body and is then sprayed out from the pump body.

Preferably, the plunger pump assembly further comprises an elastic piston and a discharge joint; the elastic piston is arranged in the pump body, and when the transmission mechanism drives the piston rod to move, the elastic piston moves with respect to the pump body; the pump body is hollow and made from metal, one end of the pump body is threadedly connected with the multi-way connector, and the discharge joint is arranged at and threadedly connected with the other end of the pump body.

The pump body and the multi-way connector are connected threadedly, such that installation is easy, and connection is firmer. A tail end of the pump body is threadedly connected with the discharge joint, such that the connection is formed, and disassembly and maintenance are facilitated. The pump body is made from metal, thus having a better pressure-bearing effect and a longer service life.

Preferably, the pressure relief device comprises a rotary knob, a rotary base, a valve spool and a return spring; the valve spool is arranged in the multi-way connector, a tail end of the valve spool is clamped in the rotary base, and the return spring is disposed around the valve spool; one end of the return spring abuts against an inner wall of the corresponding open end of the multi-way connector, and the other end of the return spring abuts against the valve spool; the tail end of the valve spool stretches out of the multi-way connector and is clamped in the rotary base, and the rotary knob is arranged outside the rotary base and clamped on the rotary base; a plurality of first recesses and second recesses are alternately formed in the rotary base, and a plurality of bumps are uniformly arranged on an outer wall of the multi-way connector; when the rotary knob is rotated, the first recesses and second recesses in the rotary base rotate with respect to the bumps on the multi-way connector; and when the rotary base rotates, the valve spool is driven to stretch and retreat with respect to the pressure relief port.

By means of the pressure relief device, the pressure relief port can be easily controlled to be opened or closed to reduce the pressure in the pump body and the multi-way connector. The rotary base and the rotary knob are clamped together and rotate synchronously, and the valve spool and the rotary base are clamped together and move synchronously in the axial direction. By default, the valve spool abuts against the pressure relief port, and the return spring is in the compressed state; and because the concavity of the first recesses is different from the concavity of the second recesses and the concavity of the first recesses is greater than the concavity of the second recesses, the bumps are located in the first recesses at this moment. When the rotary knob is rotated, the rotary base rotates synchronously, the bumps will disengage from the first recesses and be clamped in the second recesses, the rotary base rotates to be away from the pressure relief port, and the valve spool will disengage from the pressure relief port. Similarly, when the rotary knob is rotated again to allow the rotary base to be close to the pressure relief port, the valve spool will automatically abut against the pressure relief port.

Preferably, a main control circuit board is arranged in the sprayer body, the plunger pump assembly comprises the multi-way connector, and an indicator light circuit board is arranged on the multi-way connector and electrically connected with the main control circuit board; a mounting protrusion for mounting the indicator light circuit board is arranged on the multi-way connector, and the indicator light circuit board and the return passage are adjacent to each other; and the return passage is transparent, an observation part is arranged on the sprayer body, and the observation part faces the return passage and is transparent.

An indicator light on the indicator light circuit board is in a normally-on state when the motor operates, such that users can visually see the flow condition of liquid in the return passage by means of the observation part. If the liquid is clear, it indicates that the paint in the multi-way connector has been completely washed away and cleaning is completed. If the liquid is stained by the color of the paint, it indicates that cleaning is not completed and is still needed. In this way, the cleaning condition can be directly observed by means of the indicator light circuit board, and user experience is better.

Preferably, a control switch and a speed control circuit board are arranged on the sprayer body, and the speed control circuit board is electrically connected with the main control circuit board and the motor; when the control switch is rotated, an output current of the speed control circuit board is freely switchable; and a first gear is arranged on the motor, the transmission mechanism comprises a reduction gear, and the first gear meshes with the reduction gear; and the first gear and the reduction gear are both spur gears. The output current of the speed control circuit board is controlled by means of the control switch to control the rotational speed of the motor, such that the universality is good. The first gear and the reduction gear are both spur gears and thus can mesh with each other more stably and reliably.

Compared with the prior art, the invention has the following beneficial effects: 1, the slider is arranged between the transmission mechanism and the piston rod, and the limiting parts are arranged in the sprayer body, such that the slider can move more stably and is prevented from shaking with respect to the sprayer body; abrasion of the slider is reduced, and the slider can drive the piston rod to stretch and retreat more stably and reliably. 2, the storage device is connected with the sprayer by means of the storage bag and the adapter, such that disassembly and cleaning are more convenient; the storage bag is a soft bag, such that paint can be added easily; the storage device is arranged on the upper portion, such that operation is flexible, 360-degree free operation can be realized, the center of gravity is balanced, and the sprayer can be held comfortably. 3, the pressure relief device is arranged in the plunger pump assembly, and pressure can be released by means of the pressure relief device, such that use is safe and reliable. 4, the cleaning device is separately and detachably connected with the sprayer body, such that cleaning is more efficient and faster. 5, the indicator light circuit board is mounted on the sprayer body, such that the condition of liquid in the return passage can be observed more visually, and the cleaning progress can be easily known. 6, the rotation speed of the motor can be controlled easily by means of the control switch to control the discharge speed of the plunger pump assembly, such that the universality is better. 7, the storage device and the plunger pump assembly are distributed on two sides of a grip portion of the sprayer body, such that the center of gravity of the sprayer body is balanced, operators can hold the sprayer body more stably with less effort, and the paint spraying direction is more stable.

REFERENCE SIGNS

1, sprayer body; 2, motor; 201, first gear; 3, plunger pump assembly; 31, piston rod; 311, cylindrical protrusion; 32, multi-way connector; 33, pump body; 34, elastic piston; 35, discharge joint; 4, transmission mechanism; 41, mounting bracket; 42, mounting platform; 43, reduction gear; 44, transmission shaft; 45, eccentric cam; 46, limiting disk; 5, slider; 51, first limiting groove; 52, second limiting groove; 6, storage device; 61, storage bag; 62, adapter; 63, sealing cover; 7, pressure relief device; 71, rotary knob; 72, rotary base; 73, valve spool; 74, return spring; 75, first recess; 72, bump; 77, second recess; 8, filter device; 9, cleaning device; 91, cleaning mounting base; 92, mounting cover; 93, water delivery pipe; 94, water outlet pipe; 95, first connecting port; 96, water outlet; 10, limiting part; 101, limiting protrusion; 11, receiving groove; 12, storage mounting base; 13, feed inlet; 14, discharge outlet; 15, first check valve ball; 16, second check valve ball; 17, pressure relief port; 18, return port; 19, return passage; 20, first abutting base; 21, second abutting base; 22, first spring; 23, second spring; 24, main control circuit board; 25, indicator light circuit board; 26, mounting protrusion; 27, observation part; 28, control switch; 29, speed control circuit; 30, support member.

DETAILED DESCRIPTION OF THE INVENTION

The invention is further described below in conjunction with embodiments illustrated by the accompanying drawings.

Figure 1:
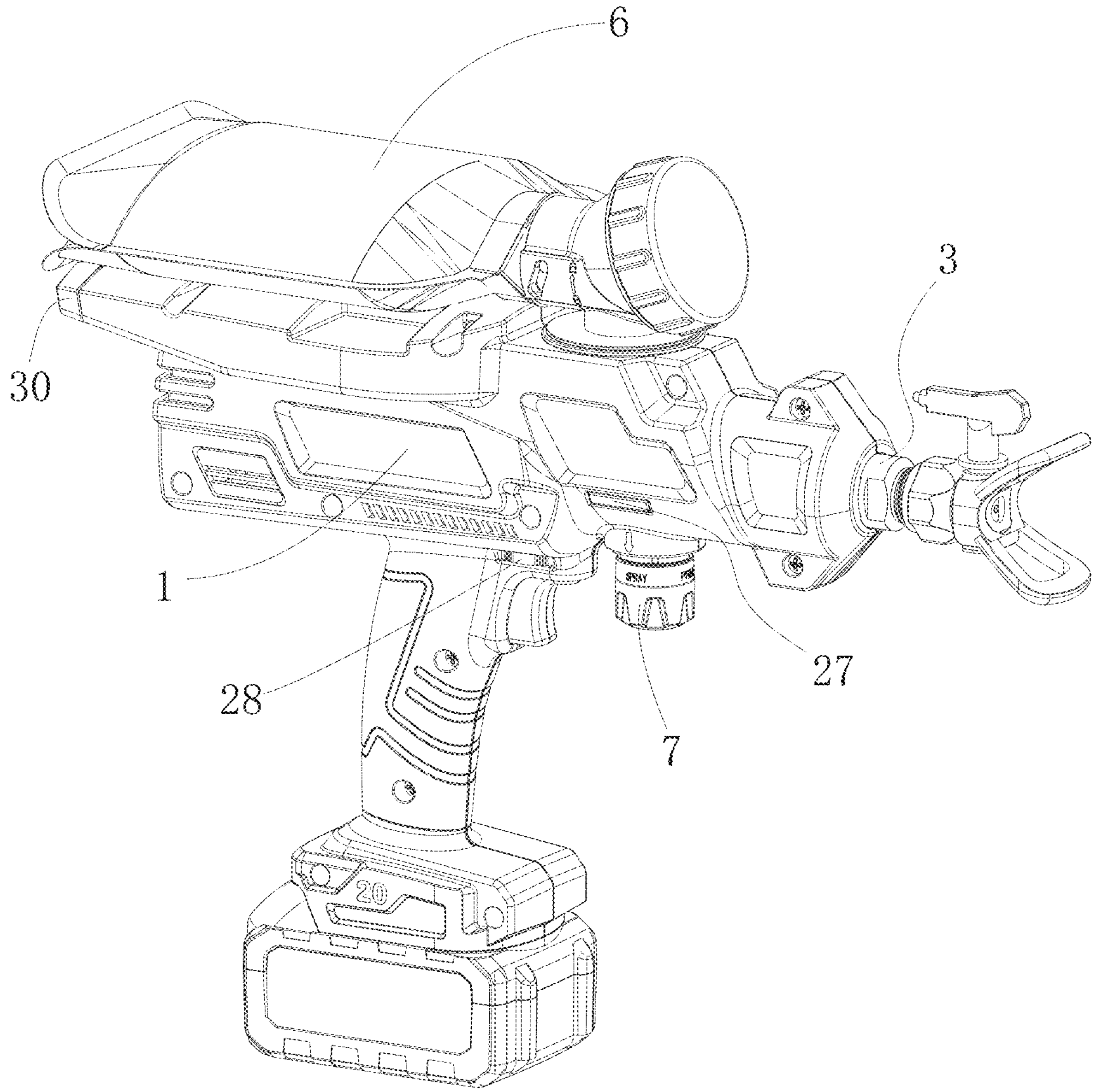
FIG. 1 is a perspective view of the invention.
Figure 2:
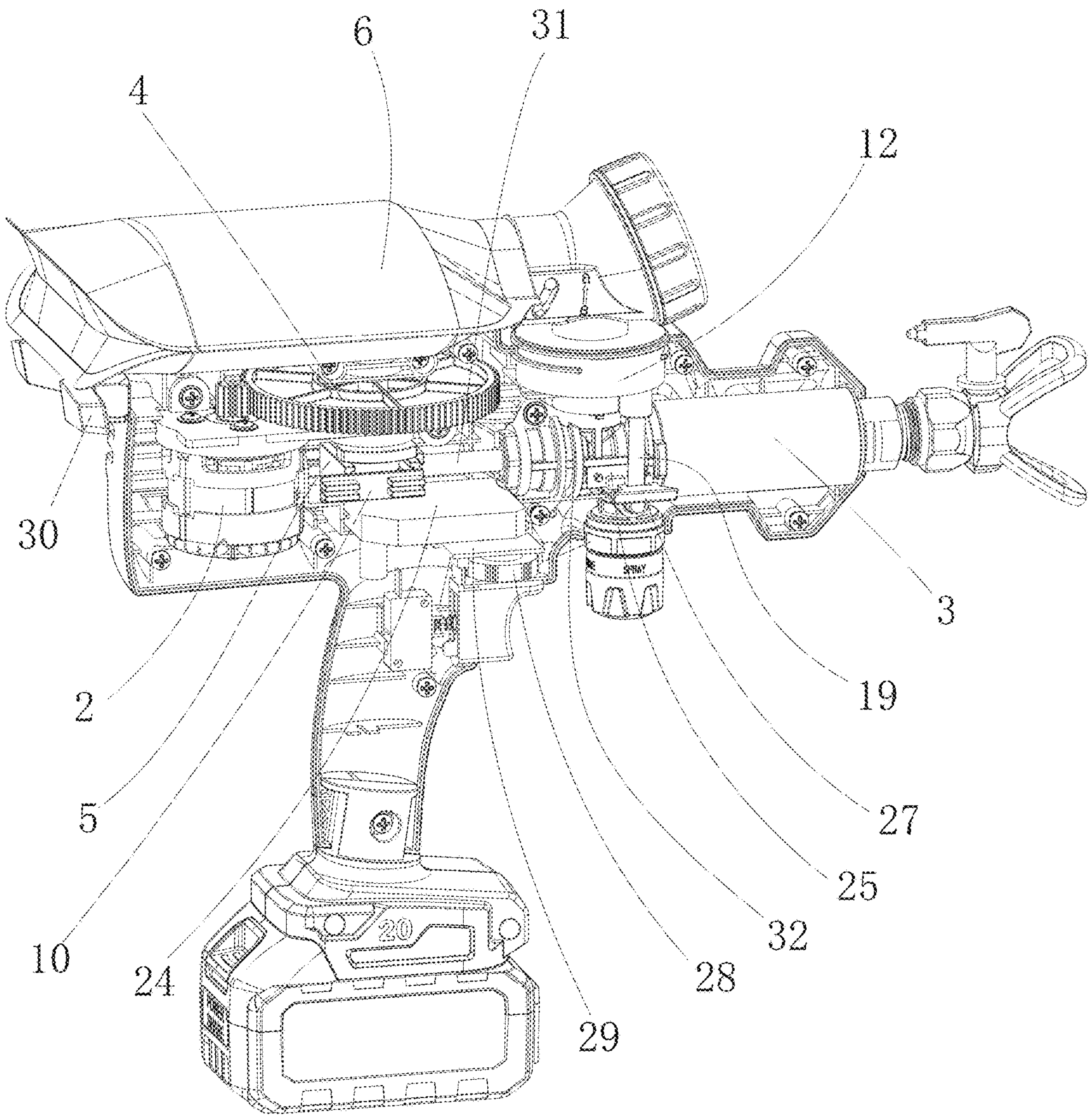
FIG. 2 is a perspective view of the invention in a case where a shell is hidden.
Figure 3:
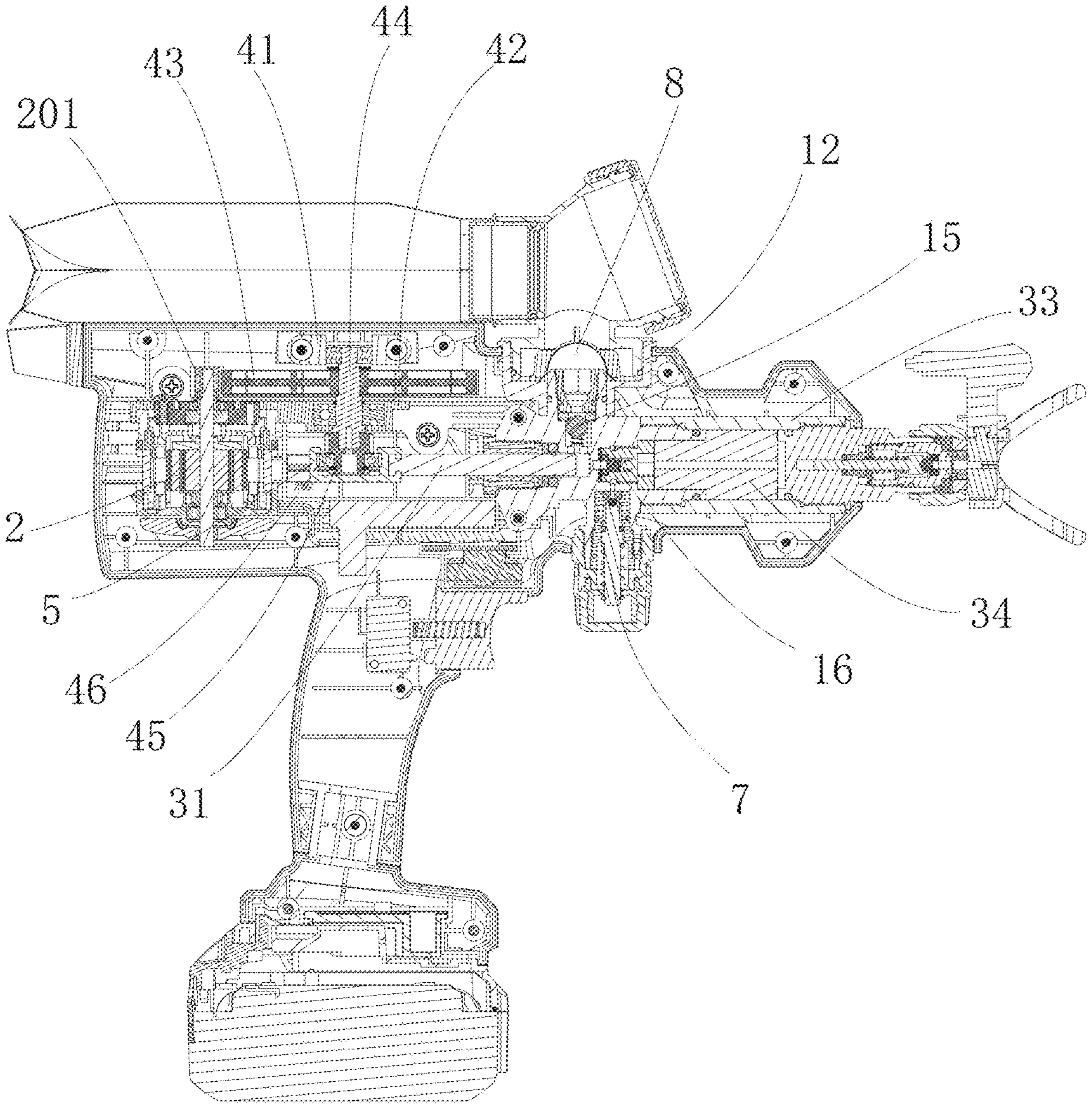
FIG. 3 is an internal structural view of the invention.
Figure 4:
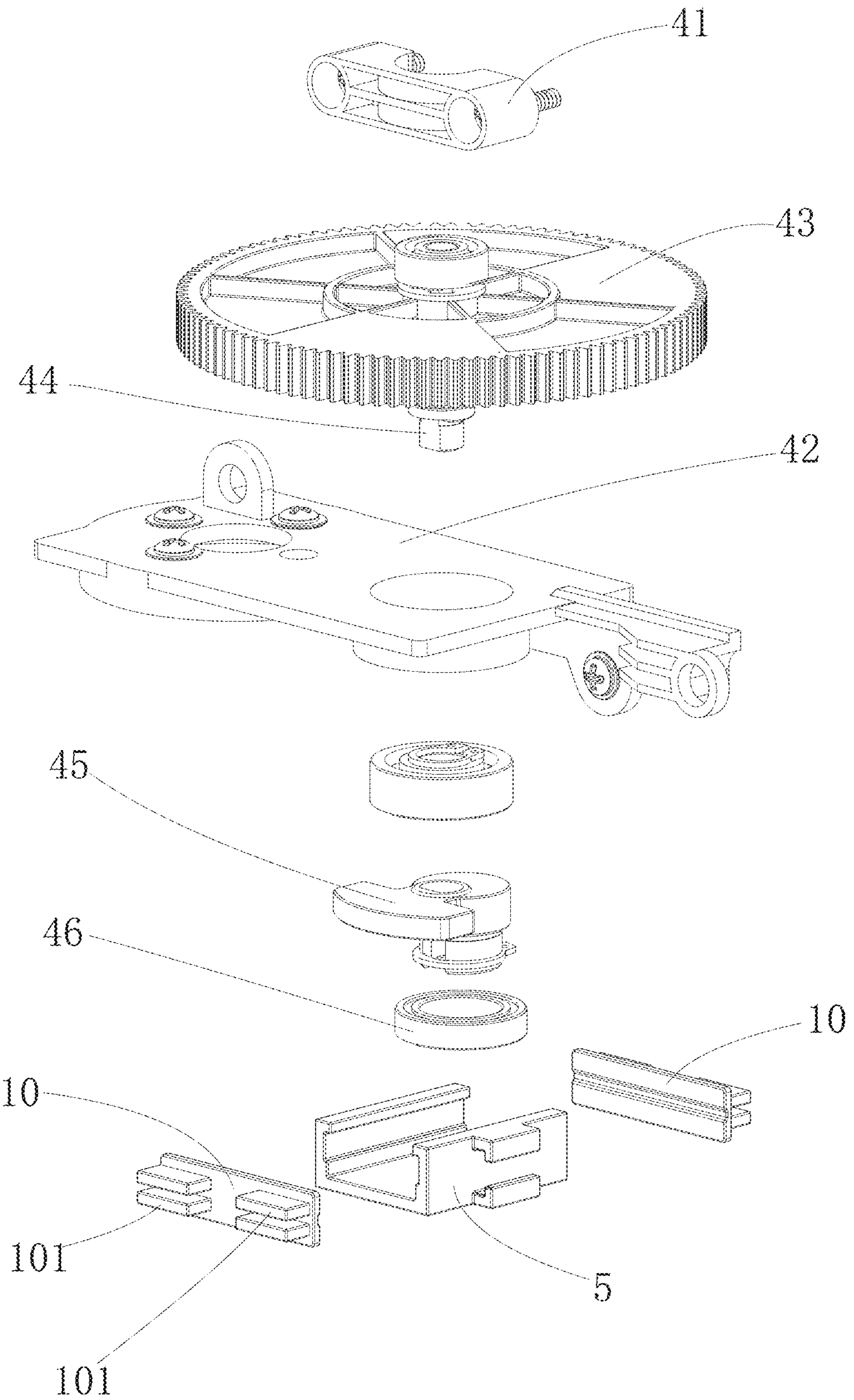
FIG. 4 is an exploded view of a transmission mechanism.
Figure 5:
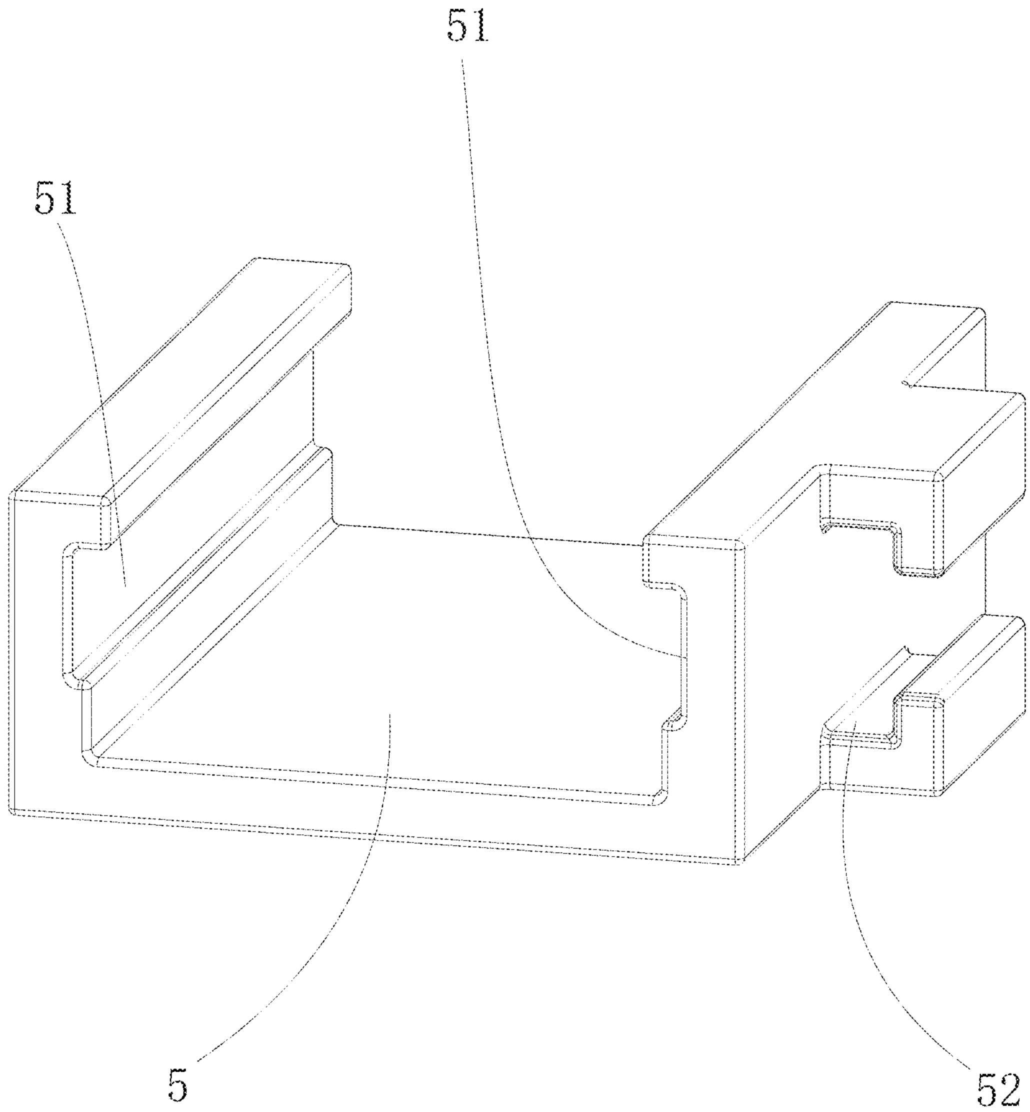
FIG. 5 is a perspective view of a slider.
Figure 6:
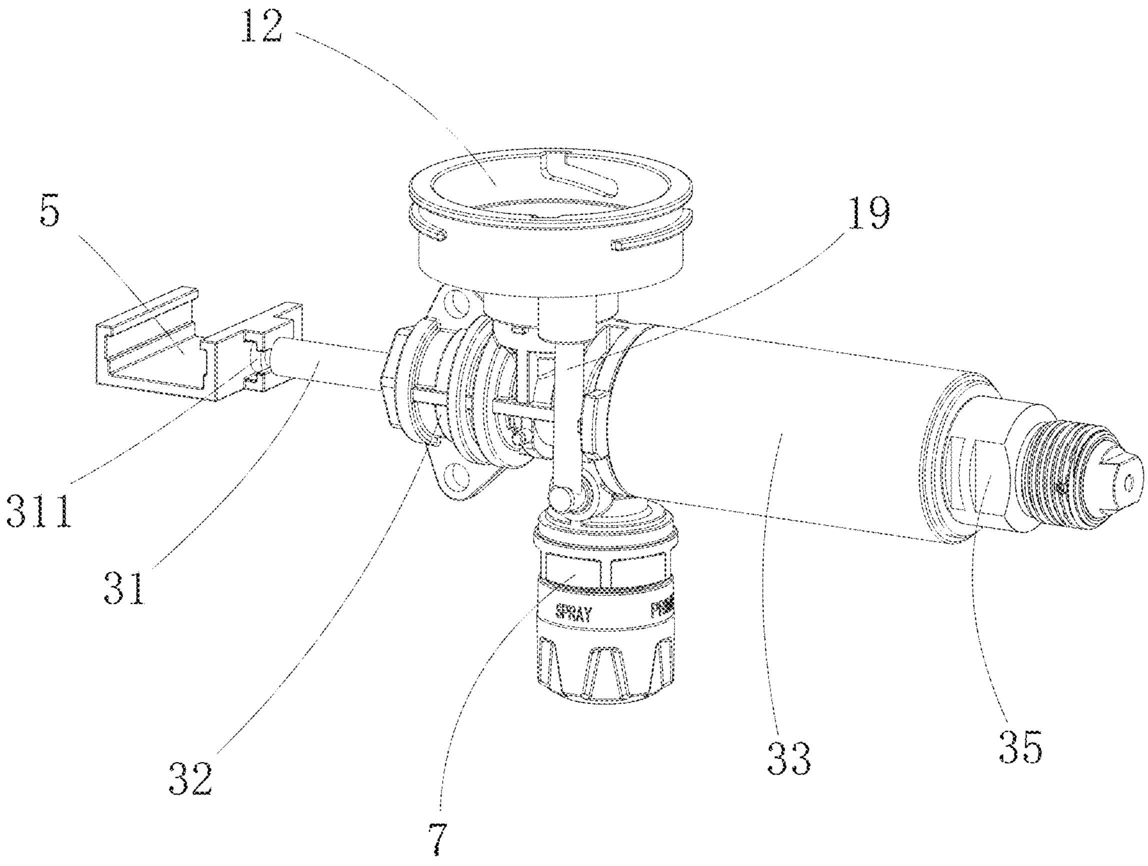
FIG. 6 is a perspective view of a plunger pump assembly.
Figure 7:
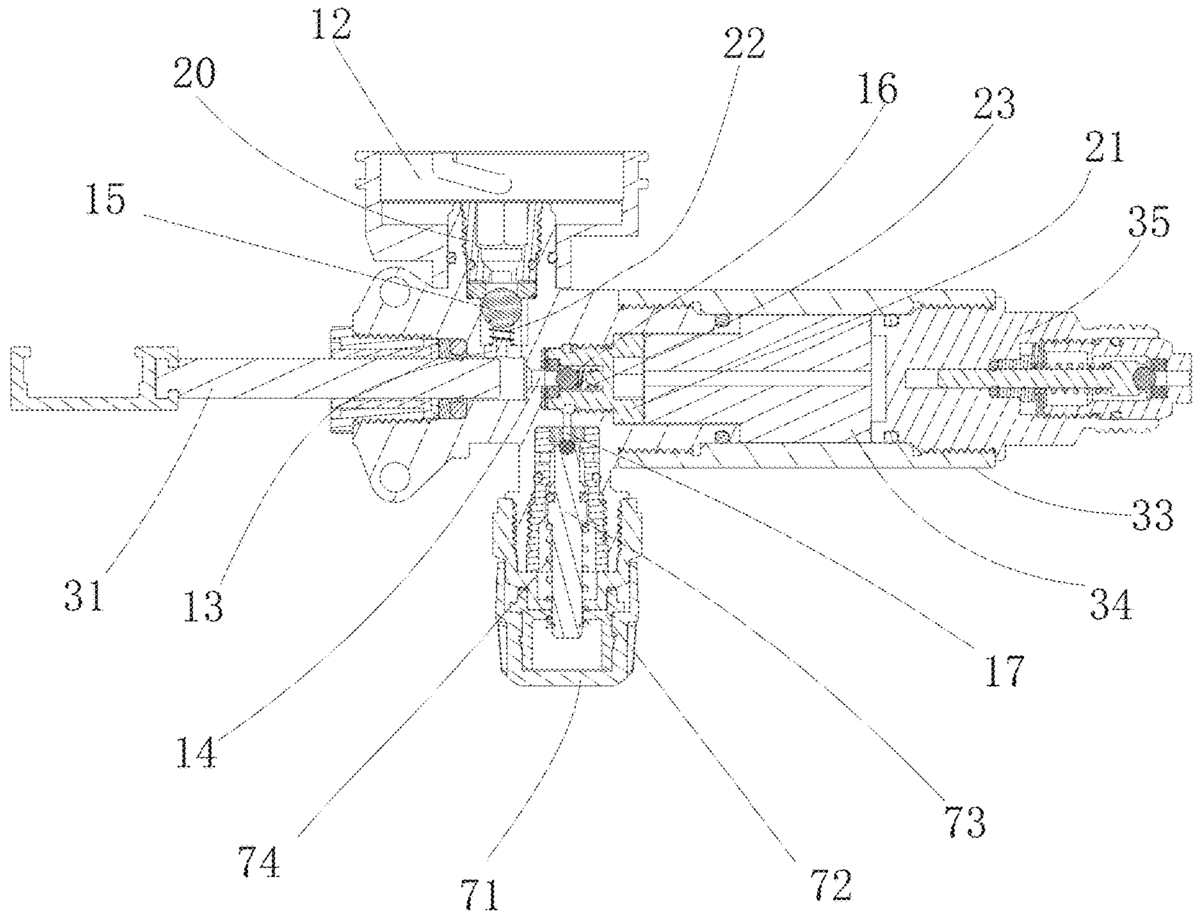
FIG. 7 is an internal structural view of the plunger pump assembly.
Figure 8:
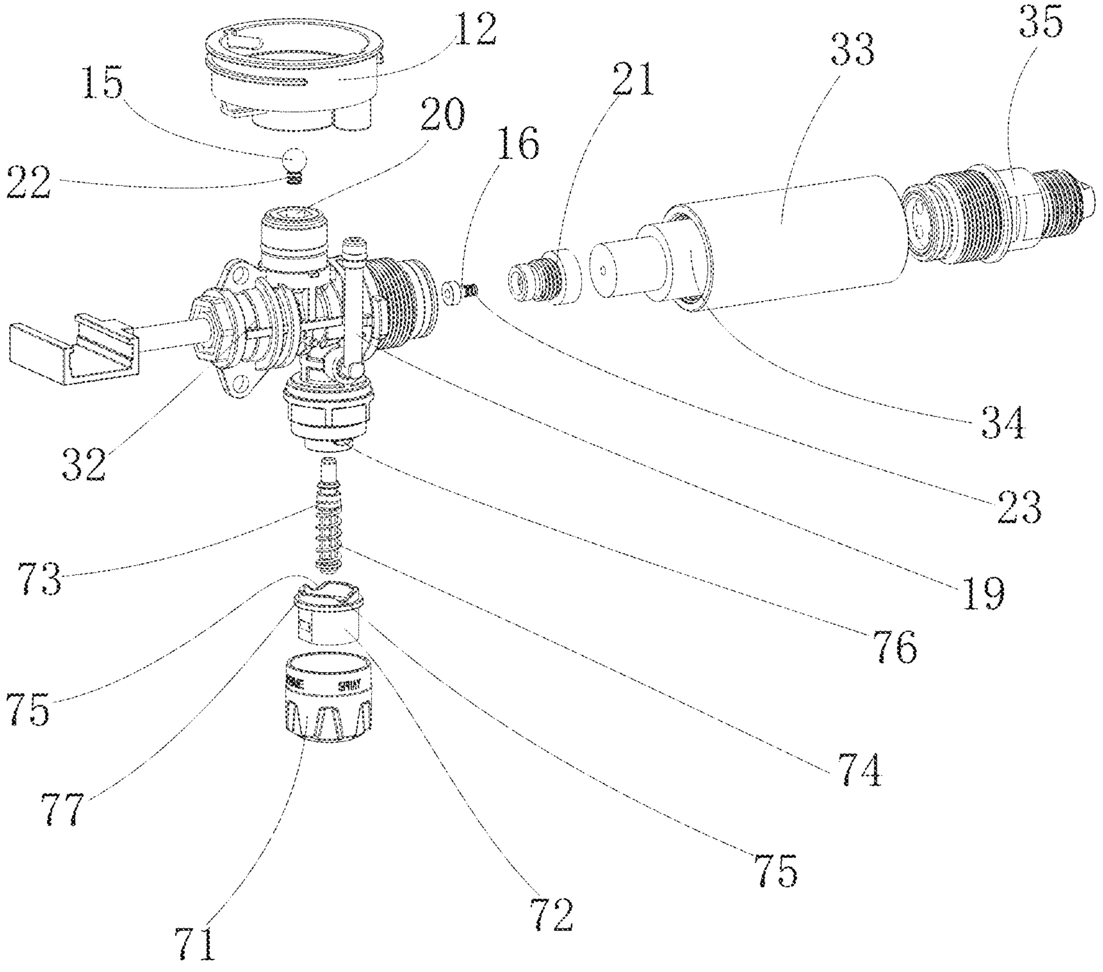
FIG. 8 is an exploded view of the plunger pump assembly.
Figure 9:
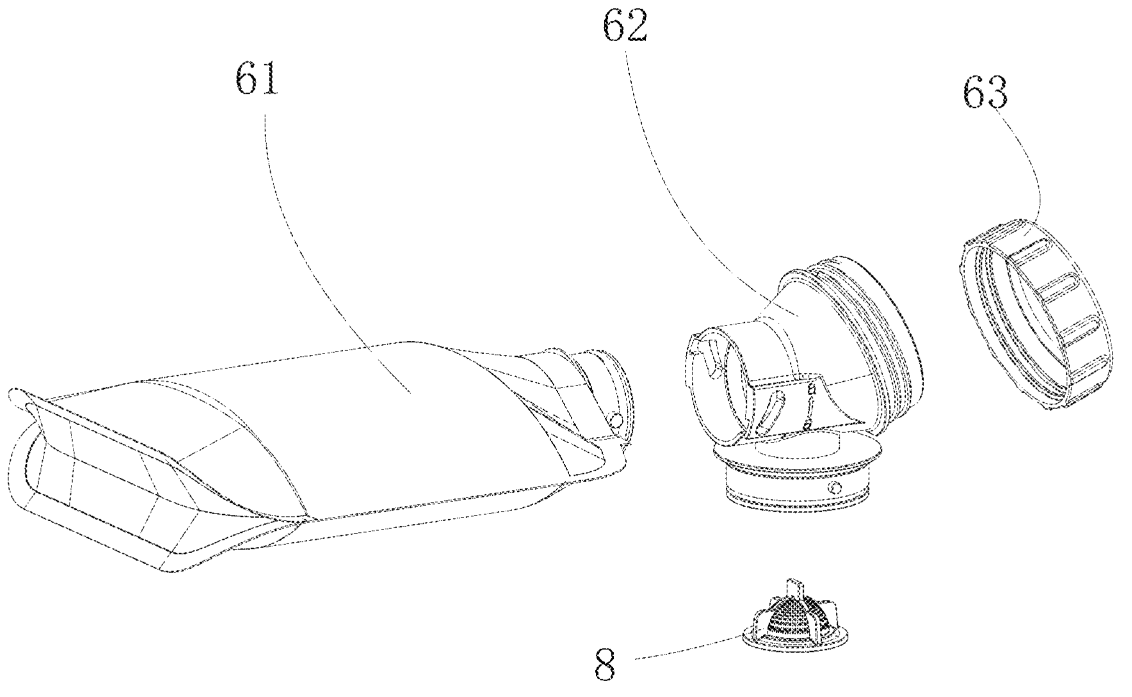
FIG. 9 is an exploded view of a storage device.
Figure 10:
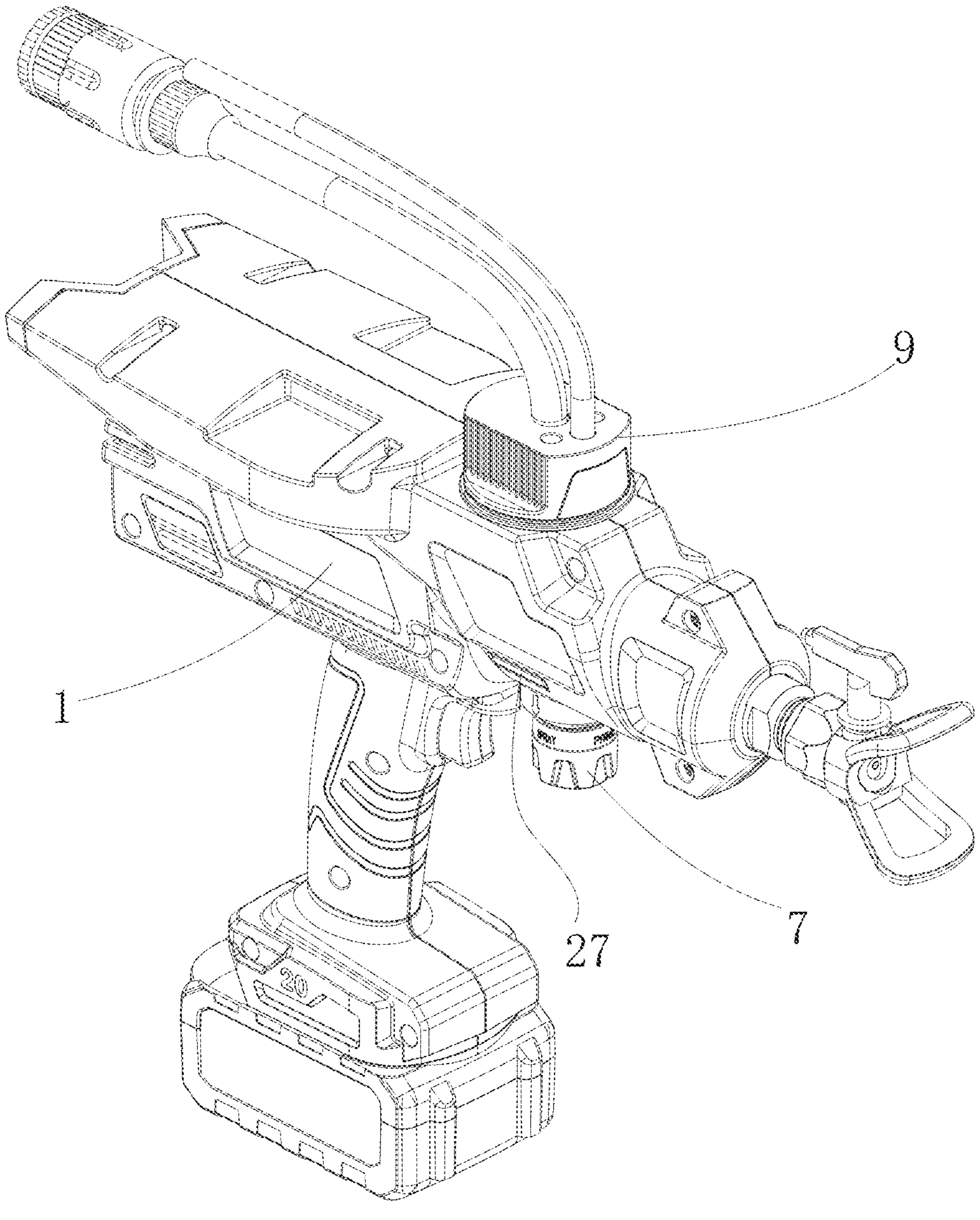
FIG. 10 is a perspective assembly view of a cleaning device and a sprayer body.
Figure 11:
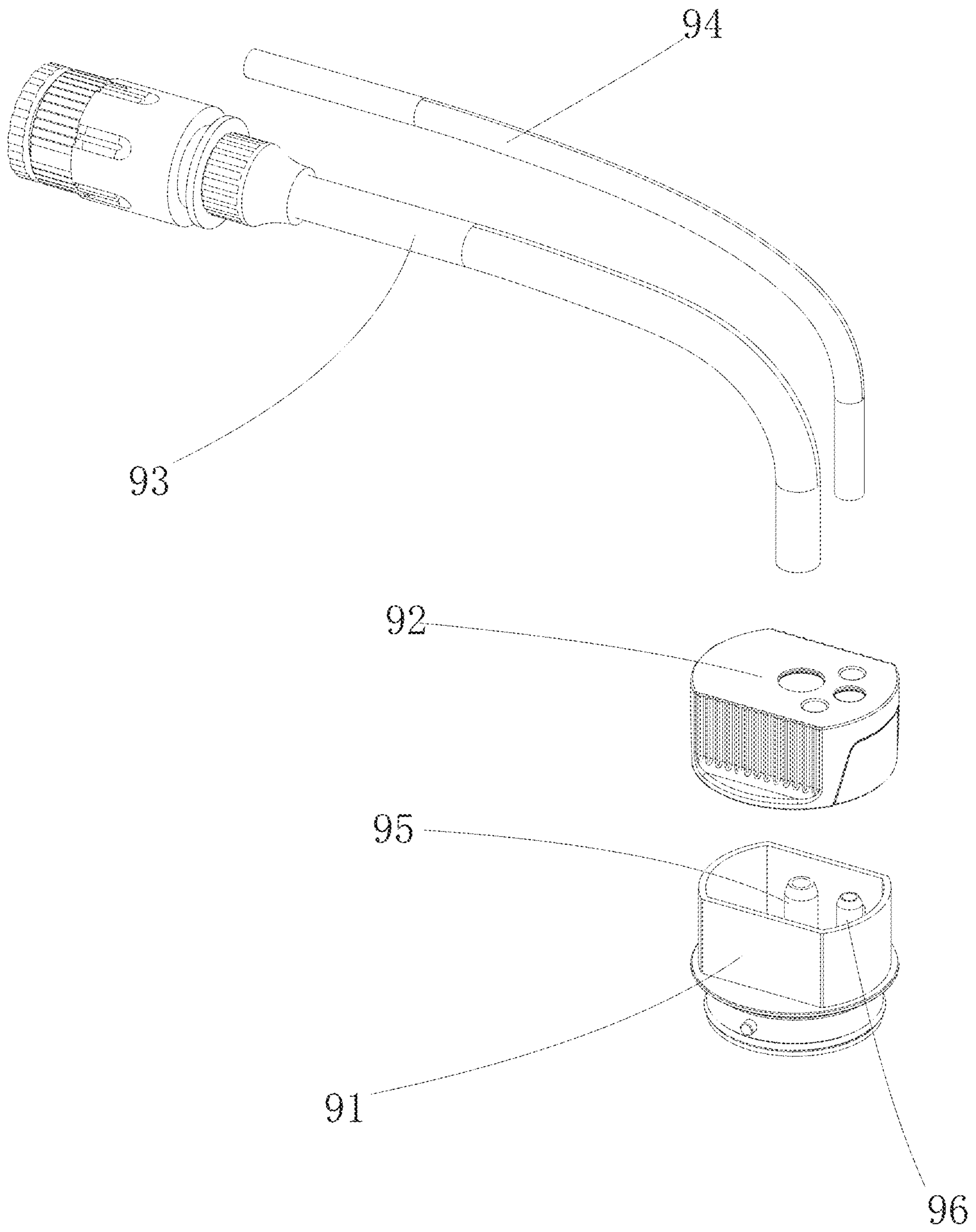
FIG. 11 is an exploded view of the cleaning device.
Figure 12:
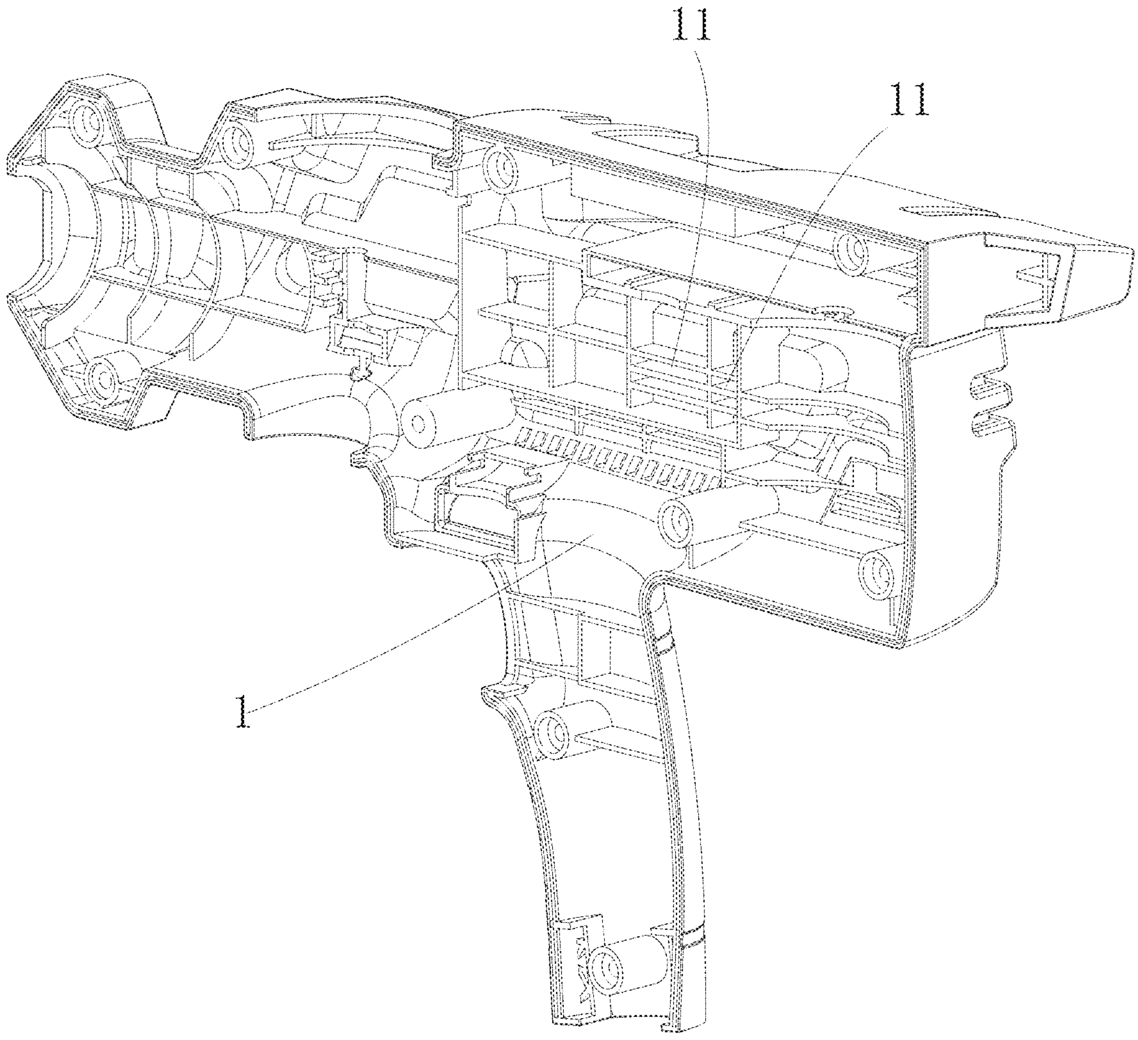
FIG. 12 is an internal structural view of the sprayer body.
Figure 13:
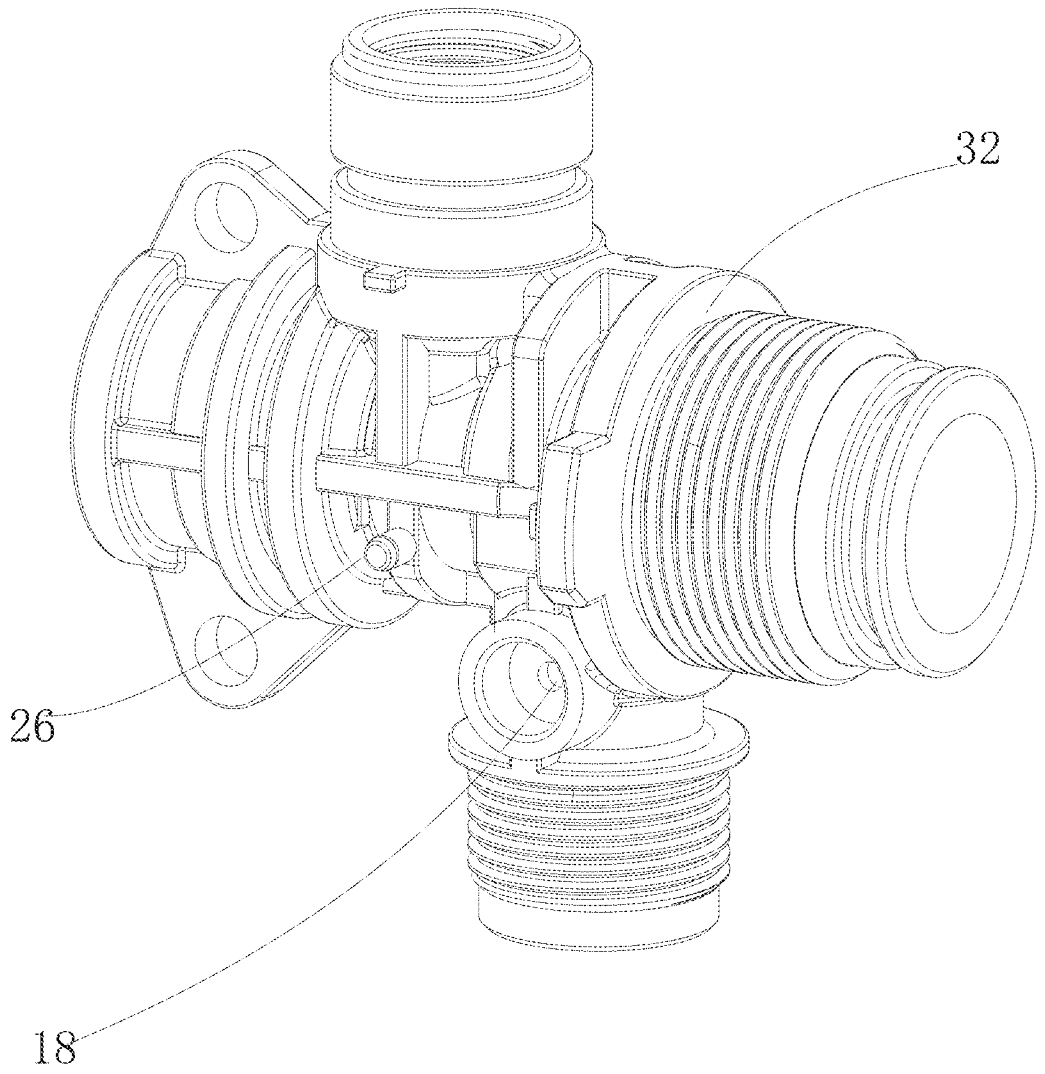
FIG. 13 is a perspective view of a multi-way connector.

As shown in FIGS. 1-13, this embodiment discloses a handheld electric sprayer with a negative-pressure soft liquid bag, comprising a sprayer body 1, wherein a motor 2 and a plunger pump assembly 3 are arranged in the sprayer body 1, a transmission mechanism 4 rotatably connected with the motor 2 is arranged in the sprayer body 1, a slider 5 for connecting the transmission mechanism 4 and the plunger pump assembly 3 is arranged between the transmission mechanism 4 and the plunger pump assembly 3, and limiting parts 10 are arranged between the slider 5 and the sprayer body 1; the plunger pump assembly 3 comprises a piston rod 31, and when the motor 2 drives the transmission mechanism 4 to rotate, the slider 5 drives the piston rod 31 to stretch and retreat; a storage device 6 detachably connected with the sprayer body 1 is arranged on an outer side of the sprayer body 1, and the storage device 6 is connected with the plunger pump assembly 3; and a pressure relief device 7 connected with the plunger pump assembly 3 is arranged on the plunger pump assembly 3, and a return passage 19 is arranged between the pressure relief device 7 and the storage device 6.

The transmission mechanism 4 comprises a mounting bracket 41, a mounting platform 42, a reduction gear 43, a transmission shaft 44, an eccentric cam 45 and a limiting disk 46; the mounting bracket 41 and the mounting platform 42 are fixedly mounted on the sprayer body 1, and the transmission shaft 44 is mounted on the mounting bracket 41 and the mounting platform 42 by means of bearings respectively; a first gear 201 rotating synchronously with the motor 2 is arranged on the motor 2 and meshes with the reduction gear 43; and the reduction gear 43 and the eccentric cam 45 which rotate synchronously with the transmission shaft 44 are arranged on the transmission shaft 44, and the limiting disk 46 rotating synchronously with the eccentric cam 45 is disposed around the eccentric cam 45 and slidably connected with the slider 5. A pair of first limiting grooves 51 is formed in the slider 5, and the limiting disk 46 is arranged in the first limiting grooves 51; the limiting disk 46 fits the first limiting grooves 51 in outer contour; the limiting parts 10 are arranged at two open ends of the slider 5 respectively, and each of the limiting parts 10 has one end surface attached to the slider 5 and the other end surface attached to the sprayer body 1; and a second limiting groove 52 to be connected with the piston rod 31 is formed in an outer side of the slider 5. The limiting parts 10 are fixedly mounted on the sprayer body 1; a plurality of limiting protrusions 101 are uniformly arranged at an end, facing the sprayer body 1, of each of the limiting parts 10, receiving grooves 11 for mounting the limiting protrusions 101 are formed in the sprayer body 1, and the limiting protrusions 101 fit the receiving grooves 11 in outer contour; a cylindrical protrusion 311 is disposed at a tail end of the piston rod 31 and slidably arranged in the second limiting groove 52; and the cylindrical protrusion 311 is slidably connected with the second limiting groove 52.

The plunger pump assembly 3 comprises a multi-way connector 32 and a pump body 33, wherein a storage mounting base 12 threadedly connected with the multi-way connector 32 is arranged on the multi-way connector 32; a storage device 6 threadedly connected with the storage mounting base 12 is arranged on the storage mounting base 12, and a filter device 8 is arranged in the storage mounting base 12; a feed inlet 13 and a discharge outlet 14 are formed in the multi-way connector 32; a first check valve ball 15 is arranged between the feed inlet 13 and the filter device 8, and a second check valve ball 16 is arranged between the discharge outlet 14 and the pump body 33; a pressure relief port 17 is formed in the multi-way connector 32, and a pressure relief device 7 detachably connected with the multi-way connector 32 is arranged at an open end of the multi-way connector 32; and a return port 18 is formed in the multi-way connector 32, and the return passage 19 connected with the return port 18 is arranged at the return port 18. The storage device 6 comprises a storage bag 61, a sealing cover 63 and an adapter 62; the storage bag 61 is threadedly connected with the adapter 62, the sealing cover 63 threadedly connected with the adapter 62 is arranged on the adapter 62, and the adapter 62 is threadedly connected with the storage mounting base 12; the filter device 8 is arranged between the storage mounting base 12 and the adapter 62, the bottom of the filter device 8 is attached to an end surface of the storage mounting base 12, and a bracket of the filter device 8 is attached to an end surface of the adapter 62; and a filter screen of the filter device 8 faces the adapter 62. A support member 30 is arranged at a tail end of the sprayer body 1, and the support member 30, a grip portion of the sprayer body 1 and a battery pack of the sprayer body 1 form a stable triangular support structure, such that the sprayer body 1 can be directly and stably placed on the horizontal plane when paint is added into the storage device 6. Because an open end of adapter 62 is arranged obliquely, the open end of adapter 62 will be erected vertically when the sprayer body 1 is placed obliquely. At this moment, the sealing cover 63 can be opened to add paint to the storage bag 61. Since paint is added vertically, the paint can be added more quickly and will not overflow, pollution will not be caused by the paint, and the handheld electric sprayer can be used more safely and environmentally friendlily. The support member 1 is a damping part and has a certain buffer effect, such that the sprayer body 1 can be obliquely placed more stably. Moreover, the storage device 6 is arranged above the sprayer body 1 on the whole, and an axial direction of the adapter 62 and the storage mounting base 12 is the vertical direction; and when the plunger pump assembly 3 operates, paint is pumped into the storage mounting base 12 and then automatically flows from top to bottom under the action of gravity, such that the paint can be pumped by the plunger pump assembly 3 more quickly. Moreover, the paint will not accumulate in the storage mounting base 12, and the plunger pump assembly 3 is unlikely to be blocked, such that the handheld electric sprayer can be used more safely and reliably. In addition, the storage device 6 is arranged above the sprayer body 1 on the whole and the storage bag 61 is arranged behind the plunger pump assembly 3, that is, the storage bag 61 and the plunger pump assembly 3 are distributed front and back, such that the center of gravity of the sprayer body 1 is closer to the center, operators can hold the sprayer body 1 more flexibly and easily, the sprayer body 1 is more stable when held by the operators, the paint spraying direction is more reliable, and the sprayer body 1 will not shake when operated by the operators, thus avoiding the situation where the paint is sprayed out in an incorrect direction and guaranteeing user experience. A cleaning device 9 detachably connected with the storage mounting base 12 is arranged on the storage mounting base 12 and comprises a cleaning mounting base 91, a mounting cover 92, a water delivery pipe 93 and a water outlet pipe 94; the cleaning mounting base 91 and the storage mounting base 12 are connected threadedly, and the mounting cover 92 in close fit and connection with the cleaning mounting base 91 is arranged on the cleaning mounting base 91; a first connecting port 95 and a water outlet 96 are formed in the cleaning mounting base 91, and the first connecting port 95 is connected with the water delivery pipe 93; and the water outlet 96 is connected with the water outlet pipe 94, and the water outlet 96 and the return passage 19 are connected.

A first abutting base 20 and a second abutting base 21 threadedly connected with open ends of the multi-way connector 32 are arranged at the open ends of the multi-way connector 32 respectively, a first spring 22 is arranged between the first abutting base 20 and the feed inlet 13, one end of the first spring 22 abuts against an inner wall of the discharge outlet 14, and the other end of the first spring 22 abuts against the first check valve ball 15; the first check valve ball 15 is adjacent to an open end of the first abutting base 20, and when the plunger pump assembly 3 operates, the first check valve ball 15 moves in the axial direction with respect to the open end of the first abutting base 20; a second spring 23 is arranged between the second abutting base 21 and the discharge outlet 14, one end of the second spring 23 abuts against the second abutting base 21, and the other end of the second spring 23 abuts against the second check valve ball 16; the second check valve ball 16 is adjacent to the discharge outlet 14, and when the plunger pump assembly 3 operates, the second check valve ball 16 moves with respect to the discharge outlet 14; and the first abutting base 20 and the second abutting base 21 are both hollow, and the second abutting base 31 is connected with the pump body 22. The plunger pump assembly 3 further comprises an elastic piston 34 and a discharge joint 35; the elastic piston 34 is arranged in the pump body 33, and when the transmission mechanism 4 drives the piston rod 31 to move, the elastic piston 34 moves with respect to the pump body 33; the pump body 33 is hollow and made from metal, one end of the pump body 33 is threadedly connected with the multi-way connector 32, and the discharge joint 35 is arranged at and threadedly connected with the other end of the pump body 33. The pressure relief device 7 comprises a rotary knob 71, a rotary base 72, a valve spool 73 and a return spring 74; the valve spool 73 is arranged in the multi-way connector 32, a tail end of the valve spool 73 is clamped in the rotary base 72, and the return spring 73 is disposed around the valve spool 73; one end of the return spring 74 abuts against an inner wall of the corresponding open end of the multi-way connector 32, and the other end of the return spring 74 abuts against the valve spool 73; the tail end of the valve spool 73 stretches out of the multi-way connector 32 and is clamped in the rotary base 72, and the rotary knob 71 is arranged outside the rotary base 72 and clamped on the rotary base 72; a plurality of first recesses 75 and second recesses 77 are alternately formed in the rotary base 72, and a plurality of bumps 76 are uniformly arranged on an outer wall of the multi-way connector 32; when the rotary knob 71 is rotated, the first recesses 75 and second recesses 77 in the rotary base 72 rotate with respect to the bumps 76 on the multi-way connector 32; and when the rotary base 72 rotates, the valve spool 73 is driven to stretch and retreat with respect to the pressure relief port 17.

A main control circuit board 24 is arranged in the sprayer body 1, the plunger pump assembly 3 comprises the multi-way connector 32, and an indicator light circuit board 25 is arranged on the multi-way connector 32 and electrically connected with the main control circuit board 24; a mounting protrusion 26 for mounting the indicator light circuit board 25 is arranged on the multi-way connector 32, and the indicator light circuit board 25 and the return passage 19 are adjacent to each other; and the return passage 19 is transparent, an observation part 27 is arranged on the sprayer body 1, and the observation part 27 faces the return passage 19 and is transparent. A control switch 28 and a speed control circuit board 29 are arranged on the sprayer body 1, and the speed control circuit board 29 is electrically connected with the main control circuit board 24 and the motor 2; when the control switch 28 is rotated, an output current of the speed control circuit board 29 is freely switchable; and the first gear 201 is arranged on the motor 2, the transmission mechanism 4 comprises the reduction gear 43, and the first gear 201 meshes with the reduction gear 43; and the first gear 201 and the reduction gear 43 are both spur gears.

The specific operating process of this embodiment is as follows: when spraying is needed, paint is added into the storage bag 61 of the storage device 6 first, and then the adapter 64 and the storage mounting base 12 are connected threadedly. Next, the motor 2 is started to drive the first gear 201 to rotate, and when the first gear 201 rotates, the reduction gear 43 is driven to rotate with respect to the sprayer body 1; when the reduction gear 43 rotates, the transmission shaft 44 is driven to rotate, and when the transmission shaft 44 rotates, the eccentric cam 45 is driven to rotate; when the eccentric cam 45 rotates, the limiting disk 46 is driven to rotate eccentrically to drive the slider 5 to reciprocate; and when the slider 5 moves, the piston rod 31 is pushed to stretch and retreat. The first limiting grooves 51 are formed in the slider 5, and the limiting disk 46 fits the first limiting grooves 51 in outer contour, such that the slider 5 can be vertically limited with respect to the sprayer body 1 by the limiting disk 46; end surfaces of the first limiting grooves 51 are perpendicular to end surfaces of the sprayer body 1, and the axial direction of the first limiting grooves 51 is perpendicular to the axial direction of the piston rod 31, such that the slider 5 can be clamped in the limiting disk 46 in a direction perpendicular to the sprayer body 1, thus facilitating the installation of the sliders 5. Moreover, the limiting parts 10 are arranged between the sprayer body 1 and an open section of the slider 5, such that the slider 5 is prevented from sliding forwards and backwards with respect to the sprayer body 1.

When the piston rod 31 retreats, the tail end of the piston rod 31 is away from the inside of the multi-way connector 32, such that a negative pressure is generated in the multi-way connector 32, the first check valve ball 25 squeezes the first spring 22, the open end of the first abutting base 20 is in an open state, and paint enters the multi-way connector 32 along the feed inlet 13. Because of the negative pressure generated in the multi-way connector 32, the second spring 23 is always in a compressed state, the second check valve ball 16 is sucked to the discharge outlet 14, and the discharge outlet 14 is in a closed state, such that paint is pumped into the multi-way connector 32 from the storage device 6. When stretching out, the piston rod 31 squeezes an inner cavity of the multi-way connector 32, the first spring 22 restores, the first check valve ball 15 abuts against the open end of the first abutting base 20, and paint cannot flow back into the storage device 6. At this moment, the paint squeezes the second check valve ball 16 to drive the second check valve ball 16 to move away from the discharge outlet 14, and the second spring 23 is further compressed, such that the paint can enter the pump body 33 via the discharge outlet 14. Then, the motor 2 drives the piston rod 31 to stretch and retreat repeatedly by means of the transmission mechanism 4, such that the paint continuously enters the pump body 33 and is then sprayed out from the pump body 33.

When cleaning is needed, the cleaning device 9 is mounted on the storage mounting base 12. The water delivery pipe 93 is mounted on the first connecting port 95, the water delivery pipe 93 is connected to a water source, and the water outlet pipe 94 is connected to the water outlet 96. During cleaning, the water source is turned on, and then the motor 2 is started, such that water is continuously pressed into the pump body 33 to clean the pump body 33. At the beginning of cleaning, the pressure relief device 7 is closed to allow water to directly enter the pump body 33; after the pump body 33 is cleaned for a period of time, the pressure relief device 7 is opened to allow part of water to enter the water outlet 96 through the return passage 19; because the indicator light circuit board 25 is arranged near the return passage 19, an indicator light on the indicator light circuit board 25 is in a normally-on state when the motor 2 operates, such that users can easily observe whether there exists the color of paint in the return passage 19. If there is no color of paint in the return passage 19, water will be discharged directly via the water outlet, and the inside of the multi-way connector will be cleaned when the water is discharged. If the color of paint is observed in the return passage 19, it indicates that cleaning is still needed. Here, clean water may be added into the storage bag 61 of the storage device 6 to clean the plunger pump assembly 3.

By means of the pressure relief device 7, the pressure relief port 17 can be easily controlled to be opened or closed to reduce the pressure in the pump body 33 and the multi-way connector 32. The rotary base 72 and the rotary knob 71 are clamped together and rotate synchronously, and the valve spool 73 and the rotary base 72 are clamped together and move synchronously in the axial direction. By default, the valve spool 73 abuts against the pressure relief port 17, and the return spring 74 is in the compressed state; and because the concavity of the first recesses 75 is different from the concavity of the second recesses 77 and the concavity of the first recesses 75 is greater than the concavity of the second recesses 77, the bumps 76 are located in the first recesses 75 at this moment. When the rotary knob 71 is rotated, the rotary base 72 rotates synchronously, the bumps 76 will disengage from the first recesses 75 and be clamped in the second recesses 77, the rotary base 72 rotates to be away from the pressure relief port 17, and the valve spool 73 will disengage from the pressure relief port 17. Similarly, when the rotary knob 71 is rotated again to allow the rotary base 72 to be close to the pressure relief port 17, the valve spool 73 will automatically abut against the pressure relief port 17.

The specific embodiments described here are merely used to explain the spirit of the invention by way of examples. Those skilled in the art can make various modifications, supplements or similar substitutions to these specific embodiments described here without departing from the spirit of the invention or exceeding the scope defined by the appended claims.

The invention claimed is:

1. A handheld electric sprayer with a negative-pressure soft liquid bag, the handheld electric sprayer comprising a sprayer body, a motor, and a plunger pump assembly, wherein the motor and the plunger pump assembly are arranged in the sprayer body, wherein a transmission mechanism rotatably connected with the motor is arranged in the sprayer body, a slider for connecting the transmission mechanism and the plunger pump assembly is arranged between the transmission mechanism and the plunger pump assembly, and limiting parts are arranged between the slider and the sprayer body;

the plunger pump assembly comprises a piston rod, and when the motor drives the transmission mechanism to rotate, the slider drives the piston rod to stretch and retreat and generate the negative-pressure;

a storage device detachably connected with the sprayer body is arranged on an outer side of the sprayer body, and the storage device is connected with the plunger pump assembly; and a pressure relief device connected with the plunger pump assembly is arranged on the plunger pump assembly, and a return passage is arranged between the pressure relief device and the storage device, wherein a main control circuit board is arranged in the sprayer body, the plunger pump assembly comprises the multi-way connector, and an indicator light circuit board is arranged on the multi-way connector and electrically connected with the main control circuit board;

a mounting protrusion for mounting the indicator light circuit board is arranged on the multi-way connector, and the indicator light circuit board and the return passage are adjacent to each other; and the return passage is transparent, an observation part is arranged on the sprayer body, and the observation part faces the return passage and is transparent.

2. The handheld electric sprayer with the negative-pressure soft liquid bag according to claim 1, wherein the transmission mechanism comprises a mounting bracket, a mounting platform, a reduction gear, a transmission shaft, an eccentric cam and a limiting disk;

the mounting bracket and the mounting platform are fixedly mounted on the sprayer body, and the transmission shaft is mounted on the mounting bracket and the mounting platform by means of bearings respectively;

a first gear rotating synchronously with the motor is arranged on the motor and meshes with the reduction gear; and the reduction gear and the eccentric cam which rotate synchronously with the transmission shaft are arranged on the transmission shaft, and the limiting disk rotating synchronously with the eccentric cam is disposed around the eccentric cam and slidably connected with the slider.

3. The handheld electric sprayer with the negative-pressure soft liquid bag according to claim 1, wherein the plunger pump assembly comprises a multi-way connector and a pump body, a storage mounting base threadedly connected with the multi-way connector is arranged on the multi-way connector;

the storage device threadedly connected with the storage mounting base is arranged on the storage mounting base, and a filter device is arranged in the storage mounting base;

a feed inlet and a discharge outlet are formed in the multi-way connector;

a first check valve ball is arranged between the feed inlet and the filter device, and a second check valve ball is arranged between the discharge outlet and the pump body;

a pressure relief port is formed in the multi-way connector, and the pressure relief device detachably connected with the multi-way connector is arranged at an open end of the multi-way connector; and a return port is formed in the multi-way connector, and the return passage connected with the return port is arranged at the return port.

4. The handheld electric sprayer with the negative-pressure soft liquid bag according to claim 3, wherein a first abutting base and a second abutting base threadedly connected with open ends of the multi-way connector are arranged at the open ends of the multi-way connector respectively, a first spring is arranged between the first abutting base and the feed inlet, a first end of the first spring abuts against an inner wall of the discharge outlet, and a second end of the first spring abuts against the first check valve ball;

the first check valve ball is adjacent to an open end of the first abutting base, and when the plunger pump assembly operates, the first check valve ball moves in an axial direction with respect to the open end of the first abutting base;

a second spring is arranged between the second abutting base and the discharge outlet, a first end of the second spring abuts against the second abutting base, and a second end of the second spring abuts against the second check valve ball;

the second check valve ball is adjacent to the discharge outlet, and when the plunger pump assembly operates, the second check valve ball moves with respect to the discharge outlet; and the first abutting base and the second abutting base are both hollow, and the second abutting base is connected with the pump body.

5. The handheld electric sprayer with the negative-pressure soft liquid bag according to claim 3, wherein the plunger pump assembly further comprises an elastic piston and a discharge joint;

the elastic piston is arranged in the pump body, and when the transmission mechanism drives the piston rod to move, the elastic piston moves with respect to the pump body; and the pump body is hollow and made from metal, a first end of the pump body is threadedly connected with the multi-way connector, and the discharge joint is arranged at and threadedly connected with a second end of the pump body.

6. The handheld electric sprayer with the negative-pressure soft liquid bag according to claim 3, wherein the pressure relief device comprises a rotary knob, a rotary base, a valve spool and a return spring;

the valve spool is arranged in the multi-way connector, a tail end of the valve spool is clamped in the rotary base, and the return spring is disposed around the valve spool;

a first end of the return spring abuts against an inner wall of the corresponding open end of the multi-way connector, and a second end of the return spring abuts against the valve spool;

the tail end of the valve spool stretches out of the multi-way connector and is clamped in the rotary base, and the rotary knob is arranged outside the rotary base and clamped on the rotary base;

a plurality of first recesses and second recesses are alternately formed in the rotary base, and a plurality of bumps are uniformly arranged on an outer wall of the multi-way connector;

when the rotary knob is rotated, the plurality of first recesses and second recesses in the rotary base rotate with respect to the plurality of bumps on the multi-way connector; and when the rotary base rotates, the valve spool is driven to stretch and retreat with respect to the pressure relief port.

7. The handheld electric sprayer with the negative-pressure soft liquid bag according to claim 1, wherein a control switch and a speed control circuit board are arranged on the sprayer body, and the speed control circuit board is electrically connected with the main control circuit board and the motor;

when the control switch is rotated, an output current of the speed control circuit board is freely switchable;

a first gear is arranged on the motor, the transmission mechanism comprises a reduction gear, and the first gear meshes with the reduction gear; and the first gear and the reduction gear are both spur gears.

8. A handheld electric sprayer with a negative-pressure soft liquid bag, the handheld electric sprayer comprising a sprayer body, a motor, and a plunger pump assembly, wherein the motor and the plunger pump assembly are arranged in the sprayer body, wherein a transmission mechanism rotatably connected with the motor is arranged in the sprayer body, a slider for connecting the transmission mechanism and the plunger pump assembly is arranged between the transmission mechanism and the plunger pump assembly, and limiting parts are arranged between the slider and the sprayer body;

the plunger pump assembly comprises a piston rod, and when the motor drives the transmission mechanism to rotate, the slider drives the piston rod to stretch and retreat and generate the negative-pressure;

a storage device detachably connected with the sprayer body is arranged on an outer side of the sprayer body, and the storage device is connected with the plunger pump assembly; and a pressure relief device connected with the plunger pump assembly is arranged on the plunger pump assembly, and a return passage is arranged between the pressure relief device and the storage device wherein the transmission mechanism comprises a mounting bracket, a mounting platform, a reduction gear, a transmission shaft, an eccentric cam and a limiting disk;

the mounting bracket and the mounting platform are fixedly mounted on the sprayer body, and the transmission shaft is mounted on the mounting bracket and the mounting platform by means of bearings respectively;

a first gear rotating synchronously with the motor is arranged on the motor and meshes with the reduction gear; and the reduction gear and the eccentric cam which rotate synchronously with the transmission shaft are arranged on the transmission shaft, and the limiting disk rotating synchronously with the eccentric cam is disposed around the eccentric cam and slidably connected with the slider, wherein a pair of first limiting grooves is formed in the slider, and the limiting disk is arranged in the pair of first limiting grooves;

the limiting disk fits the pair of first limiting grooves in outer contour;

the limiting parts are arranged at two open ends of the slider respectively, and each of the limiting parts has a first end surface attached to the slider and a second end surface attached to the sprayer body; and a second limiting groove to be connected with the piston rod is formed in an outer side of the slider.

9. The handheld electric sprayer with the negative-pressure soft liquid bag according to claim 8, wherein the limiting parts are fixedly mounted on the sprayer body;

a plurality of limiting protrusions are uniformly arranged at an end, facing the sprayer body, of each of the limiting parts, receiving grooves for mounting the plurality of limiting protrusions are formed in the sprayer body, and the plurality of limiting protrusions fit the receiving grooves in outer contour;

a cylindrical protrusion is disposed at a tail end of the piston rod and slidably arranged in the second limiting groove; and the cylindrical protrusion is slidably connected with the second limiting groove.

10. A handheld electric sprayer with a negative-pressure soft liquid bag, the handheld electric sprayer comprising a sprayer body, a motor, and a plunger pump assembly, wherein the motor and the plunger pump assembly are arranged in the sprayer body, wherein a transmission mechanism rotatably connected with the motor is arranged in the sprayer body, a slider for connecting the transmission mechanism and the plunger pump assembly is arranged between the transmission mechanism and the plunger pump assembly, and limiting parts are arranged between the slider and the sprayer body;

the plunger pump assembly comprises a piston rod, and when the motor drives the transmission mechanism to rotate, the slider drives the piston rod to stretch and retreat and generate the negative-pressure;

a storage device detachably connected with the sprayer body is arranged on an outer side of the sprayer body, and the storage device is connected with the plunger pump assembly; and a pressure relief device connected with the plunger pump assembly is arranged on the plunger pump assembly, and a return passage is arranged between the pressure relief device and the storage device wherein the plunger pump assembly comprises a multi-way connector and a pump body, a storage mounting base threadedly connected with the multi-way connector is arranged on the multi-way connector;

a storage device threadedly connected with the storage mounting base is arranged on the storage mounting base, and a filter device is arranged in the storage mounting base;

a feed inlet and a discharge outlet are formed in the multi-way connector;

a first check valve ball is arranged between the feed inlet and the filter device, and a second check valve ball is arranged between the discharge outlet and the pump body;

a pressure relief port is formed in the multi-way connector, and a pressure relief device detachably connected with the multi-way connector is arranged at an open end of the multi-way connector; and a return port is formed in the multi-way connector, and the return passage connected with the return port is arranged at the return port, wherein the storage device comprises a storage bag, a sealing cover and an adapter;

the storage bag is threadedly connected with the adapter, the sealing cover threadedly connected with the adapter is arranged on the adapter, and the adapter is threadedly connected with the storage mounting base;

the filter device is arranged between the storage mounting base and the adapter, a bottom of the filter device is attached to an end surface of the storage mounting base, and a bracket of the filter device is attached to an end surface of the adapter; and a filter screen of the filter device faces the adapter.

* * * * *